United States Patent [19]
Williams

[11] Patent Number: 6,151,559
[45] Date of Patent: *Nov. 21, 2000

[54] SYSTEM AND METHOD FOR CHARACTERIZING UNDESIRABLE NOISE OF A SIGNAL PATH WITHIN A SELECTED FREQUENCY BAND

[76] Inventor: Thomas H. Williams, 6423 Fairways Dr., Longmont, Colo. 80503-8321

[*] Notice: This patent issued on a continued prosecution application filed under 37 CFR 1.53(d), and is subject to the twenty year patent term provisions of 35 U.S.C. 154(a)(2).

[21] Appl. No.: 08/897,494

[22] Filed: Jun. 21, 1997

[51] Int. Cl.[7] ................................................. G06F 15/00

[52] U.S. Cl. ............................................................ 702/58

[58] Field of Search .................................. 702/58, 57, 66, 702/67, 77, 78; 315/393, 364, 392; 455/1, 4.1, 67.3, 454; 348/193, 181, 192

[56] References Cited

U.S. PATENT DOCUMENTS

| | | | |
|---|---|---|---|
| 3,651,403 | 3/1972 | Fluck, Jr. ................................. | 455/4.1 |
| 4,147,977 | 4/1979 | Dimmick ................................. | 324/415 |
| 4,455,613 | 6/1984 | Shoemaker ............................... | 702/67 |
| 4,774,438 | 9/1988 | Rogers et al. ........................... | 315/392 |
| 4,811,097 | 3/1989 | Ritter et al. ............................. | 348/608 |
| 5,073,822 | 12/1991 | Gumm et al. ............................ | 348/193 |
| 5,121,440 | 6/1992 | Ballard et al. .......................... | 382/220 |
| 5,233,418 | 8/1993 | Gumm et al. ............................ | 348/181 |
| 5,394,185 | 2/1995 | Bernard .................................... | 348/192 |
| 5,514,870 | 5/1996 | Langenbrunner ....................... | 250/367 |
| 5,608,331 | 3/1997 | Newberg et al. ........................ | 324/613 |
| 5,752,164 | 5/1998 | Jones ........................................ | 455/454 |

OTHER PUBLICATIONS

Cable Labs Louisville Co Apr. 12, 1995 Two–Way Cable Television System Characterization.
Cable Labs Louisville Co Jun. 13, 1997 ARFTG Paper Attached.
Cable Labs Louisville Co Jun. 02, 1997 Holtzman Engr. Lit. Atttached.

*Primary Examiner*—Tod R. Swann
*Assistant Examiner*—Matthew Smithers
*Attorney, Agent, or Firm*—Lacasse & Associates; Randy W. Lacasse

[57] ABSTRACT

A test (600) system for characterizing the nature and the severity of the impairments affecting a radio frequency signal path (148) which may be an upstream or a downstream channel in a cable system. Testing is done by monitoring the output of an unused signal path (614) with a filter (608) and a totaling counter (612). The filter passes impairment energy from the signal path to the counter in a frequency band of interest, thereby increasing the count value on the counter. The bandpass filter limits the ability of impairments or signals from other frequency bands to increase the counter's count value. The counter's input threshold voltage level (404) is set to trigger on impairments that are sufficiently strong to cause data errors. The count value may be used to determine the time duration of an impairment by dividing the count accumulated in one second by the center frequency of the filter. An optional digital time trace acquisition unit (710), connected to the broadband signal path output (614), may be employed to capture time traces (734) to help identify the source and the nature of the impairment. The time traces can be stored, retrieved, and analyzed by conversion into the frequency domain, by digital filtering, by plotting as a histogram, and by plotting as a waterfall display.

31 Claims, 11 Drawing Sheets

SYSTEM AND METHOD FOR CHARACTERIZING UNDESIRABLE NOISE OF A SIGNAL PATH WITHIN A SELECTED FREQUENCY BAND

BACKGROUND—FIELD OF THE INVENTION

This invention relates to tests for cable upstream and downstream systems, specifically it relates to unattended testing of cable nodes to determine which nodes have high levels of undesirable energy in critical frequency bands.

BACKGROUND—DESCRIPTION OF PRIOR ART

Cable systems currently in use typically allow two way communications between the headend or distribution hubs and many remote points that may be defined as houses and coaxial drop wires to the houses. A headend is a collection point for both upstream and downstream signals. A distribution hub, which is sometimes used in large systems, is an intermediate point between the headend and the fiber nodes where the downstream signals from the headend are split and the upstream signals are combined. For the sake of this patent, the terms headend and distribution hub may be used interchangeably. One frequently employed architecture is hybrid fiber-coax (HFC). Forward direction, or downstream, signals are transmitted from the headend via optical fibers to fiber nodes. At the fiber node, the downstream transmission is converted from an optical signal to an electrical signal. The signal is distributed from the fiber node to a plurality of remote points, which may be homes, via coaxial cable by splitting. Amplification overcomes the losses of the cable and splitting devices. This portion of the network is referred to as a tree-and-branch system. The downstream frequency range is typically 54 to 550 MHz. This downstream system typically works well because a high quality signal, which consists of many channels, is produced in the headend. The processes of splitting and amplification can produce many high quality replicas of the headend signal. Downstream signals have traditionally been analog television (TV) carriers. Digital carriers, such as digital audio, digital TV, cable telephone, and computer data, are increasingly being transported by the downstream system. The most common downsteam digital modulation technique is expected to be 64-QAM (quadrature amplitude modulation). The most common impairments expected on the downstream system are Gaussian, or random, noise and composite triple beat (CTB) distortion products.

In the return direction, or upstream, signals are transmitted from the remote points in the 5 to 30 MHz frequency band to the fiber node. The same passive devices that acted as splitters for downstream signals act as combiners for upstream signals. At the fiber optic node, the combined upstream electrical signals are converted to an optical signal for transmission to the headend. Forward and return signals typically travel inside the same coaxial cable in opposite directions. The use of diplex filters allows bi-directional travel inside a single coaxial cable. In the fiber optic bundle, forward and return signals commonly travel in opposite directions in different optic fibers.

The upstream system is problematic because noise that is introduced into one branch can contaminate the signals on all branches because the return signals are combined. This problem is commonly referred to as noise funneling. The use of 5–30 MHz for the return band makes the noise funneling problem even more acute, since man-made electrical noise is strong in this frequency band.

It has been discovered that the most common form of return band impairment is high speed bursts of noise that are typically short but powerful. The noise bursts typically last less than 10 microseconds and have most of their energy content concentrated between 5 and 15 MHz. The noise bursts are sometimes powerful enough to distort, or drive return active devices into a non-linear mode. The common sources of return noise bursts are the switching of electrical devices, such as inductive loads or motors with brushes. These noise bursts enter the cable plant at shield breaks. Other signal sources, such as broadcast or two-way ham or citizens band radio traffic, also present problems if the plant has a shield break.

Return impairment may be divided into two types: additive and multiplicative. The additive impairments are noise energy, such as impulsive noise, random noise and broadcast signals that are summed with the desired signal. The multiplicative impairments are signal path conditions that modify the desired signal. Hum modulation, intermittent connections, and carrier cross-compression are examples of multiplicative impairments. The additive impairments are typically much worse in upstream cable systems.

The most commonly discussed form of digital modulation for upstream signals is QPSK (quadrature phase shift keying) in a time division multiple access structure (TDMA). Other proposals include OFDM (orthogonal frequency division multiplexing) and S-CDMA (synchronous code division multiple access).

A number of test systems have been used to verify that a return system is ready for service or to characterize the return system for the nature, the severity, and the number of impairments affecting the reverse signal path. The test systems normally run unattended for long periods of time to record the variations in interference level over time.

One test method uses a spectrum analyzer to scan the frequency spectrum of the return system. The spectrum analyzer is typically connected to a computer for data logging via a general purpose instrumentation bus (GPIB). The computer processes stored data to obtain the statistics about ingress level at different frequencies as a percentage of the time. The weakness of this approach is that the most common form of return impairment is a short powerful burst of noise, and the spectrum analyzer may not respond to it, either because it is sweeping at another frequency when the burst arrives, or because the filters in the spectrum analyzer are too narrow to respond to the short noise pulse.

Another testing technique is to pass a test QPSK carrier over the system, and test the received data stream with a bit error rate tester (BERT). This system accurately records error data, but the data carrier's modulation power hides information about the nature of the interference. The QPSK carrier is sensitive to both additive and multiplicative impairments.

A system invented by the present inventor and assigned to Cable Television Laboratories utilizes a carrier wave to test for impairments. The carrier wave is demodulated into in-phase (I) and quadrature (Q) baseband components using a phase locked loop and a complex demodulator. A threshold region is established around each of the I and Q outputs. A digital oscilloscope is triggered when the carrier's single constellation point is pushed into the threshold region by an impairment, and the I and Q outputs are recorded by the oscilloscope. Another refinement to this test method allows the amount of time either the I or the Q signal is outside the threshold region to be recorded. This is accomplished by gating an 11 MHz square wave into a totaling counter whenever the return signal is outside the threshold region. This test method is disclosed in "Cable System Transient Impairment Characterization" in the *National Cable Television Association* 1994 *Technical Papers,* page 263. This is an excellent test method, but requires the use of a continuous wave carrier in an unused 6 MHz test bandwidth. Because this system uses a continuous wave carrier, it can detect both additive and multiplicative noise. The results are also somewhat difficult for an untrained technician to interpret. The cost of the component equipment is also higher than the method of the present test system. The test system described herein does not use a carrier wave for testing, but may optionally use a carrier wave for setup and calibration.

A scanning system for monitoring the cable return spectrum is offered by Arris Interactive. This system scans the return band in multiple steps and is called the Spectrum Sentinel System. In the preferred embodiment, this present test system continuously monitors a test bandwidth.

OBJECTS AND ADVANTAGES

It is an object of this invention to provide a system by which cable operators can determine if the impairment levels on their plants are unacceptably high on a node by node basis. It is also an object of this invention to characterize or provide information about the nature of the impairments to assist the technician with the job of repairing the plant. It is also an object of this invention to determine the data transmission capacity of the return plant. It is also an object of this invention to allow the isolation of plant problem areas to small locations if switching systems are used. Thus there is a need in the art for a test system that will allow the operator to determine which nodes require maintenance.

DRAWING FIGURES

SUMMARY

In accordance with the present invention, a test system for characterizing the impairments affecting a signal path comprising a filter and a totaling counter wherein the counter's total count is increased when an impairment passes through the filter.

Figure 1:
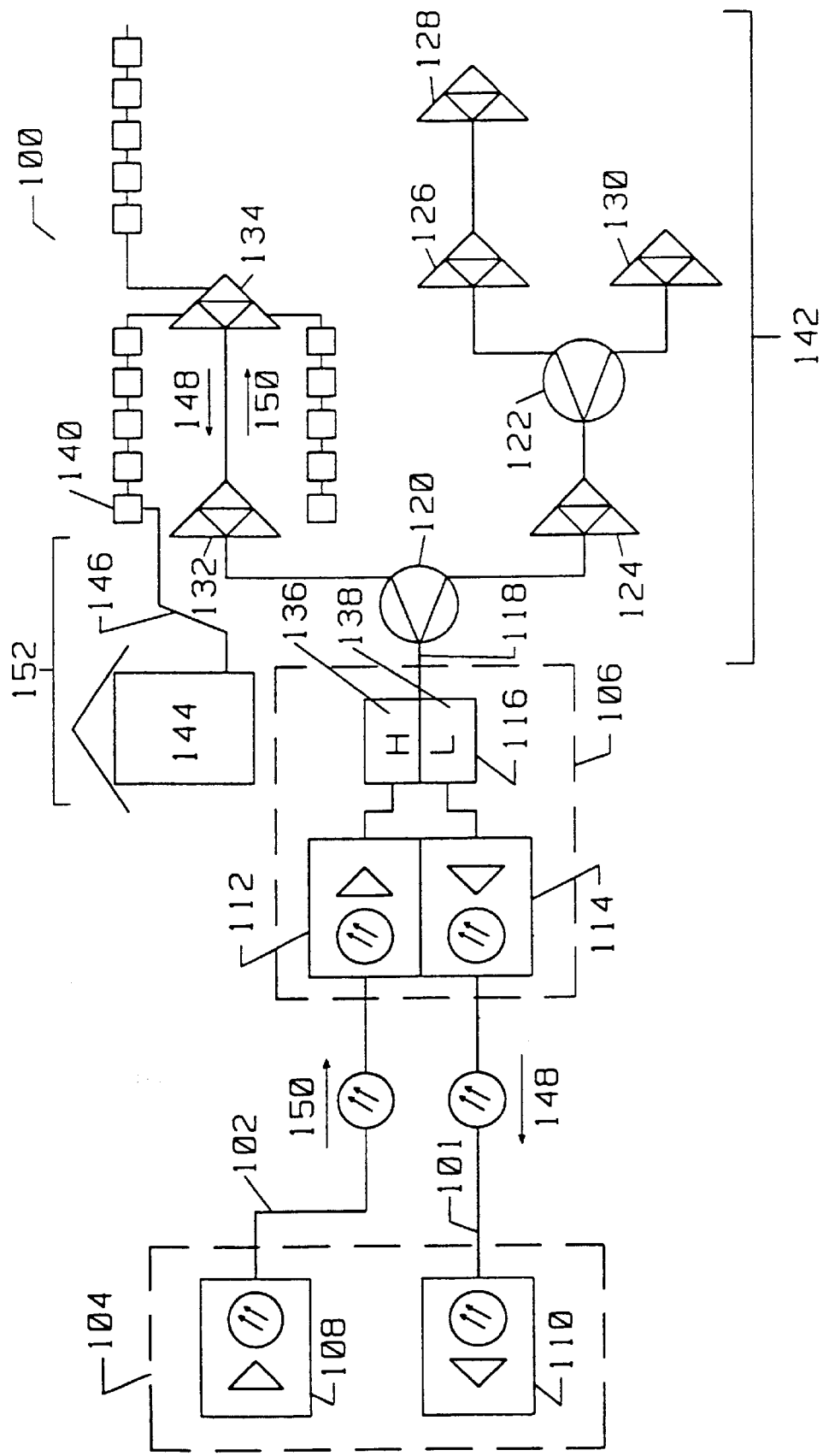
FIG. 1 is a simplified block diagram of a hybrid fiber-coax system.
Figure 2:
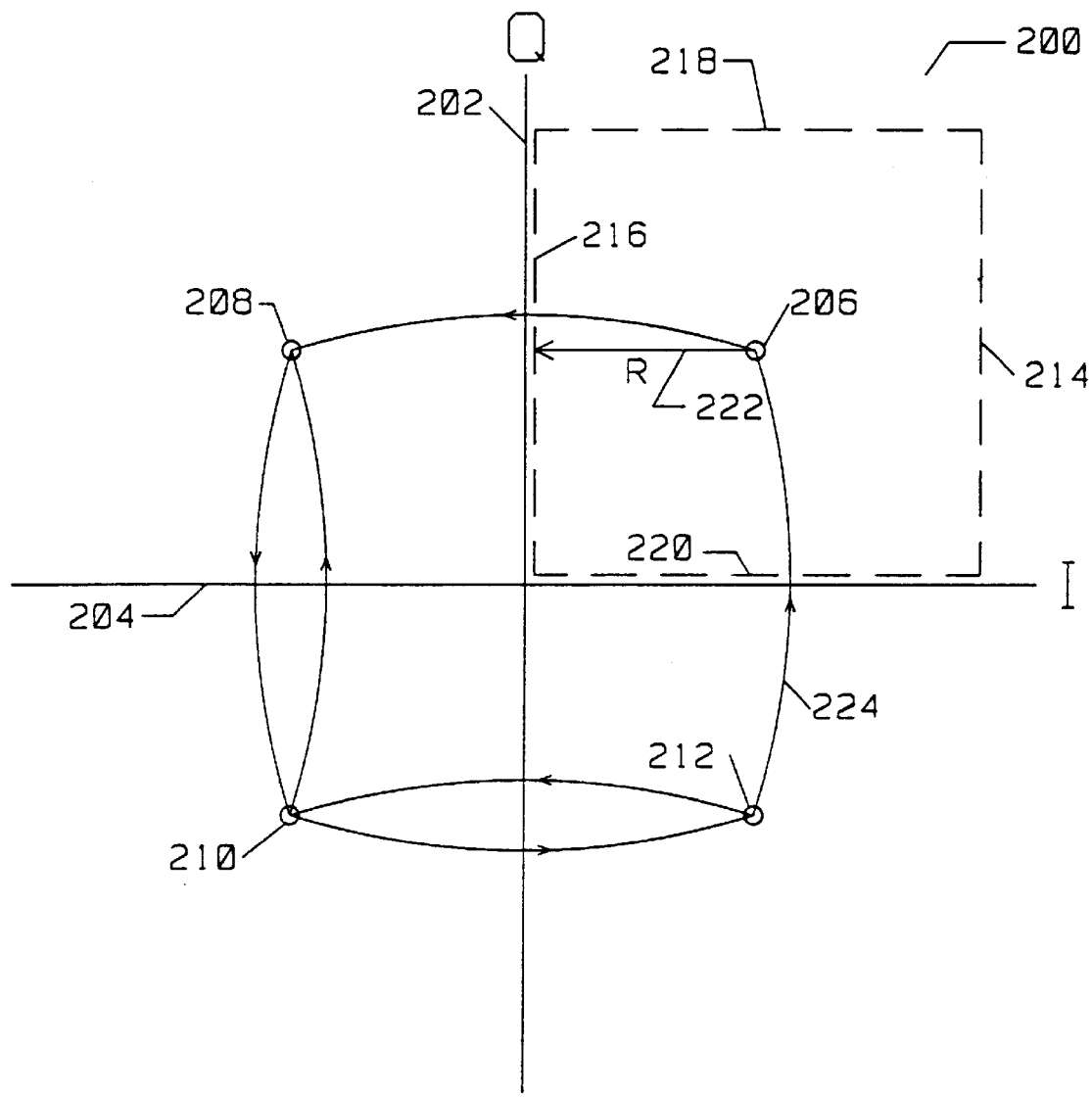
FIG. 2 is an in-phase-quadrature (I-Q) plot of a demodulated baseband QPSK data signal.
Figure 3:
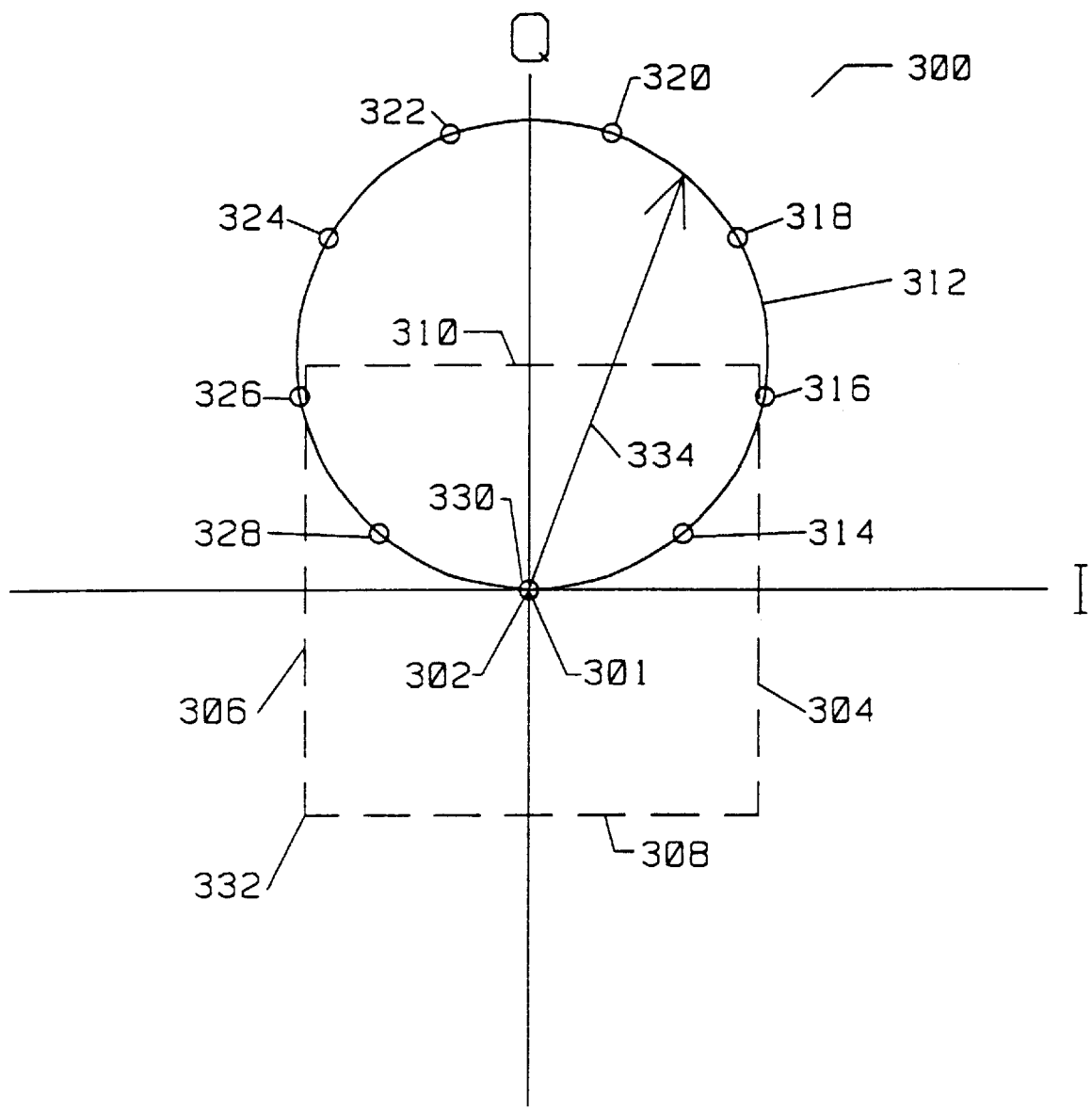
FIG. 3 is an I-Q plot of a demodulated baseband burst impairment.

Description—FIGS. 1–3

The return cable system can be monitored for undesirable energy by applying a filter, such as a bandpass filter, to the output of the upstream system at the headend. The output of the filter is applied to a high-speed electronic totaling counter with an accurately adjusted input trigger threshold level. At the beginning of a test period, the counter is reset to zero. If an impairment arrives with sufficient energy in the test frequency band, the electronic counter's total will be increased. If the counter's total is divided by the product of the center frequency of the filter times the duration of the test in seconds, the fraction of the test time that the channel was impaired can be determined.

FIG. 1 illustrates a bi-directional cable system 100 which employs a single mode downstream fiber optic cable 102 for the long reach from a headend 104 to a fiber node 106. In the headend 104, which is the collection point for downstream signals, are located a downstream laser transmitter 108 and an upstream laser receiver 110. At the fiber node 106, which is typically housed in a weather tight outdoor housing, a downstream signal is converted from an optical signal into an electrical signal by a downstream laser receiver 112. An upstream electrical signal is converted into an optical signal by an upstream laser transmitter 114. The downstream electrical signals are applied to a diplex filter 116 which allows bi-directional signal flow on a same hard line coaxial cable 118. The diplex filter consists of a high-pass section 136 and a low-pass section 138. Upstream signals taken from the hard line coaxial cable 118 pass through the diplex filter 116 into the upstream laser transmitter 114. A single mode upstream fiber optic cable 101 carries upstream optical signals to the upstream laser receiver 110 in the headend 104.

Splitter/combiners, consisting of a splitter/combiner 120 and a splitter/combiner 122 split the downstream signals and combine the upstream signals. A set of two way amplifiers 124, 126, 128, 130, 132, and 134 boost the signal level in both directions to overcome the loss of the coaxial cable 118 and the splitter/combiners 120 and 122. Taps, such as a tap 140, are also splitting/combining devices that allow signal extraction and insertion. A coaxial cable plant 142 can be defined as the coaxial portion of the bi-directional cable system 100, which extends from the fiber node 106 to the insides of the houses such as a house 144. Typically, the coaxial cable plant 142 is constructed of solid sheath hardline aluminum coaxial cable from the fiber node 106 to the tap 140, and a braided shield drop cable 146 is used from the tap to the house 144 as well as inside the house 144. House 144 and drop cable 146 form the remote point 152.

The bi-directional cable system 100 can be observed to have a signal path 148 in the upstream direction from the house 144 to the headend 104, and a signal path 150 in the downstream direction from the headend 104 to the house 144. The signal path 148 and the signal path 150 may include any portion of the upstream or downstream frequency ranges.

FIG. 2 is an I-Q plot of a demodulated baseband QPSK signal 200 that has been demodulated from an RF or IF signal into an I baseband signal voltage component and a Q baseband signal voltage component. Information is transmitted by the QPSK signal when its phase changes. The instantaneous voltage of an unimpaired QPSK signal may be seen to move between a point 206, a point 208, a point 210 and a point 212. This is illustrated as a signal trajectory 224 that moves between the points 212, 206, 208, 210, 212, back to 210 and then back to 208. Correctly reading the data requires that the point trajectory be sampled at the correct time instant. An I threshold line 202 and a Q threshold line 204 are established between the points 206, 208, 210, and 212 to determine the most probable quadrant of a received signal sample that is impaired by additive noise or other interfering signals. Another set of threshold regions may be established around the point 206, by establishing a positive I limit 214, a negative I limit 216, a positive Q limit 218 and a negative Q limit 220. The limits are all equidistant from point 206. If an impairment with a magnitude R, such as a noise vector 222, pushes a signal sample across the negative I limit 216, which is essentially in the same position as the I threshold line 202, an error may be made in reading the data.

FIG. 3 is an I-Q plot of a demodulated baseband burst impairment 300. FIG. 3 is similar to FIG. 2 with the difference that the QPSK data signal has been turned off and a burst impairment with a baseband noise trajectory 312 has been added. Turning off the QPSK data signal has the effect of collapsing the signal trajectory 224 to a single point 301 at an origin 302. A positive I limit 304, a negative I limit 306, a positive Q limit 310, and a negative Q limit 308 are established around the origin 302 to create a threshold region 332. The limits 304, 306, 308, and 310 are all the same distance from the origin 302 as the length of the noise vector 222. Also illustrated on FIG. 3 is a baseband noise trajectory 312 that starts and ends at the origin 302. For the sake of illustration, it can be assumed to last 1 microsecond. A time-varying vector 334, which is the distance of the trajectory 312 from the origin 302, forms a circle on the I-Q plot 300. A plot of the magnitude of vector 334 versus time would reveal that a half sine wave was chosen for the noise trajectory 312. This trajectory 312 was chosen for the sake of illustration. Other shape trajectories could also be chosen for illustration. It is a point of the present test system to estimate the amount of time that this baseband noise trajectory 312 spends more than a distance of R from the origin. A plurality of uniform time baseband impulse samples 314, 316, 318, 320, 322, 324, 326, 328, and 330 are taken every 0.111 microseconds. By noting the number of impulse time samples that are outside of the threshold region, the duration of time that the impulse could potentially cause the QPSK transmission to be in error can be determined. There are 6 out of 9 points outside the threshold region 332 in this example: the points 316, 318, 320, and 322, 324, and 326, so the time outside the threshold region 332 could be estimated at 0.666 microseconds, which is 6 times 0.111 microseconds.

The I-Q plot 200 and the I-Q plot 300 are baseband representations of an IF signal and an impairment that are carried over an IF (or RF) channel. In essence, the IF signal or impairment has previously been demodulated or down converted to zero frequency (direct current or DC) by a complex demodulator which is well known in the art. If the signal or the impairment is observed at IF or RF frequencies in an I-Q plot, there is a rotational angle between the uniform time voltage samples, which may be 200 degrees as an example. The effect of observing un-demodulated signals or noise on an I-Q plot is one of spinning or rotation of the signal trajectory 224 and the noise trajectory 312 about the origin 302.

Description FIGS. 4–7

Figure 4:
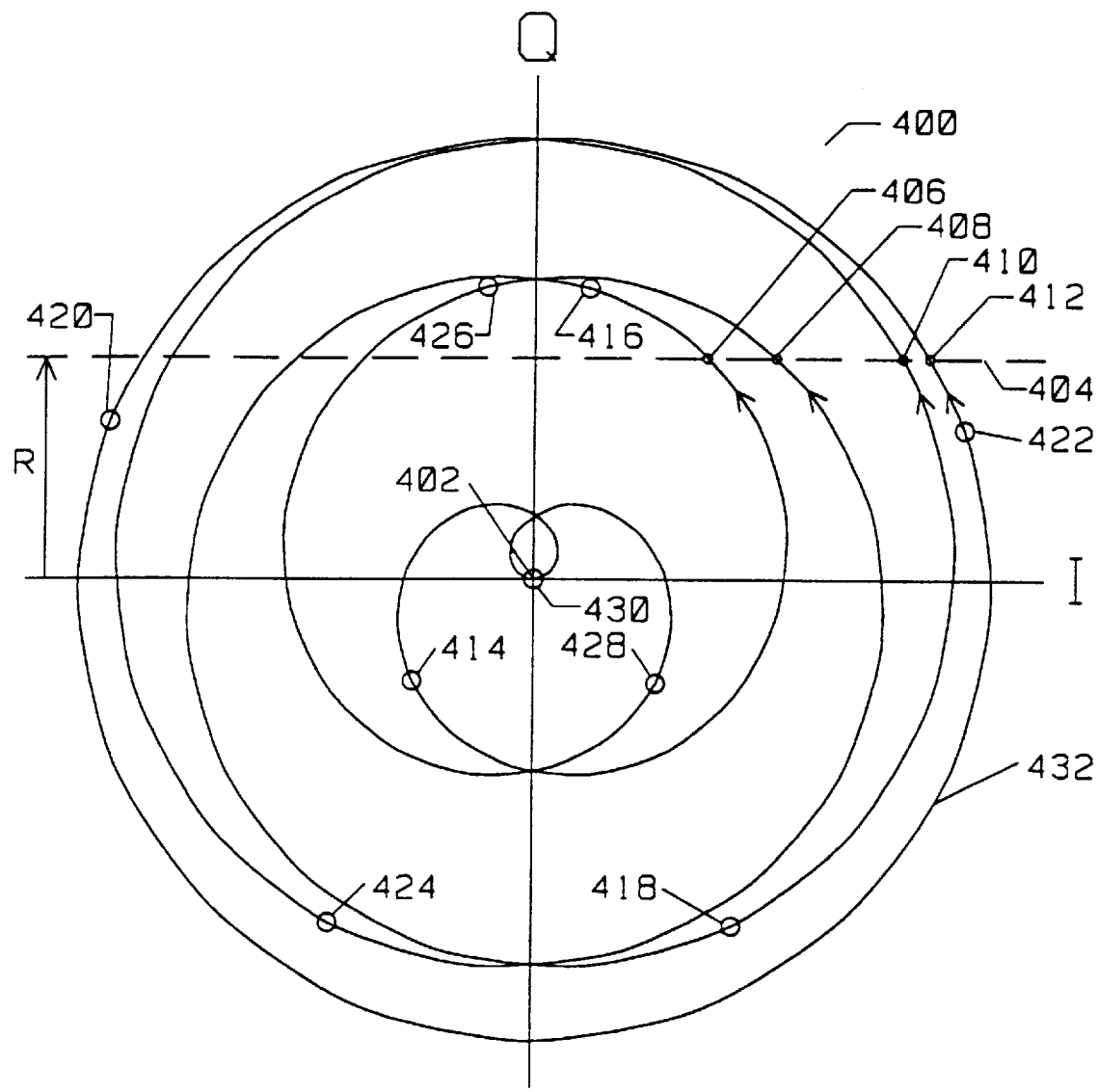
FIG. 4 is an I-Q plot of the un-demodulated burst impairment at an IF frequency.

FIG. 4 is an I-Q plot of the un-demodulated burst impairment at an IF frequency 400. The impairment is the same impairment illustrated FIG. 3, but the impairment is at an IF frequency. Typically the IF signal passes through an IF filter that has a center frequency and a bandwidth. The bandwidth is typically just wide enough to allow the IF signal through, but not excessively wide to limit the amount of noise energy that can pass through. The impairment has not been demodulated to baseband. The I-Q plot 400 differs from the I-Q plot 300 in that each baseband impulse time sample 314, 316, 318, 320, 322, 324, 326, 328 and 330 is rotated about an origin 402 by an additional 200 degrees. Thus the baseband noise trajectory 312 is transformed into a spinning IF trajectory 432. Notable on the spinning IF trajectory 432 are a number of uniform time IF time samples 414, 416, 418, 420, 422, 424, 426, 428 and 430 which are comparable to their baseband counterparts, samples 314, 316, 318, 320, 322, 324, 326, 328 and 330. A positive Q threshold voltage level 404 with magnitude R is applied to the IF trajectory 432. The number of positive going crossings can readily be counted as 4 at a set of crossing points 406, 408, 410, and 412. The amount of time that the noise trajectory was at a distance of more than R from the origin can be estimated from the number of positive going crossings. If the normal rotation rate for the I-Q vector diagram of FIG. 4 is 5 million rotations per second, and four threshold crossings caused by the impairment are observed, the time that the threshold spent over the voltage level 404 can be estimated at 4 times 0.2 microseconds, or 0.8 microseconds. Additionally, a single crossing can be used as a trigger to capture time domain data with a high speed analog to digital converter (A-D) and fast memory circuits.

Figure 5:
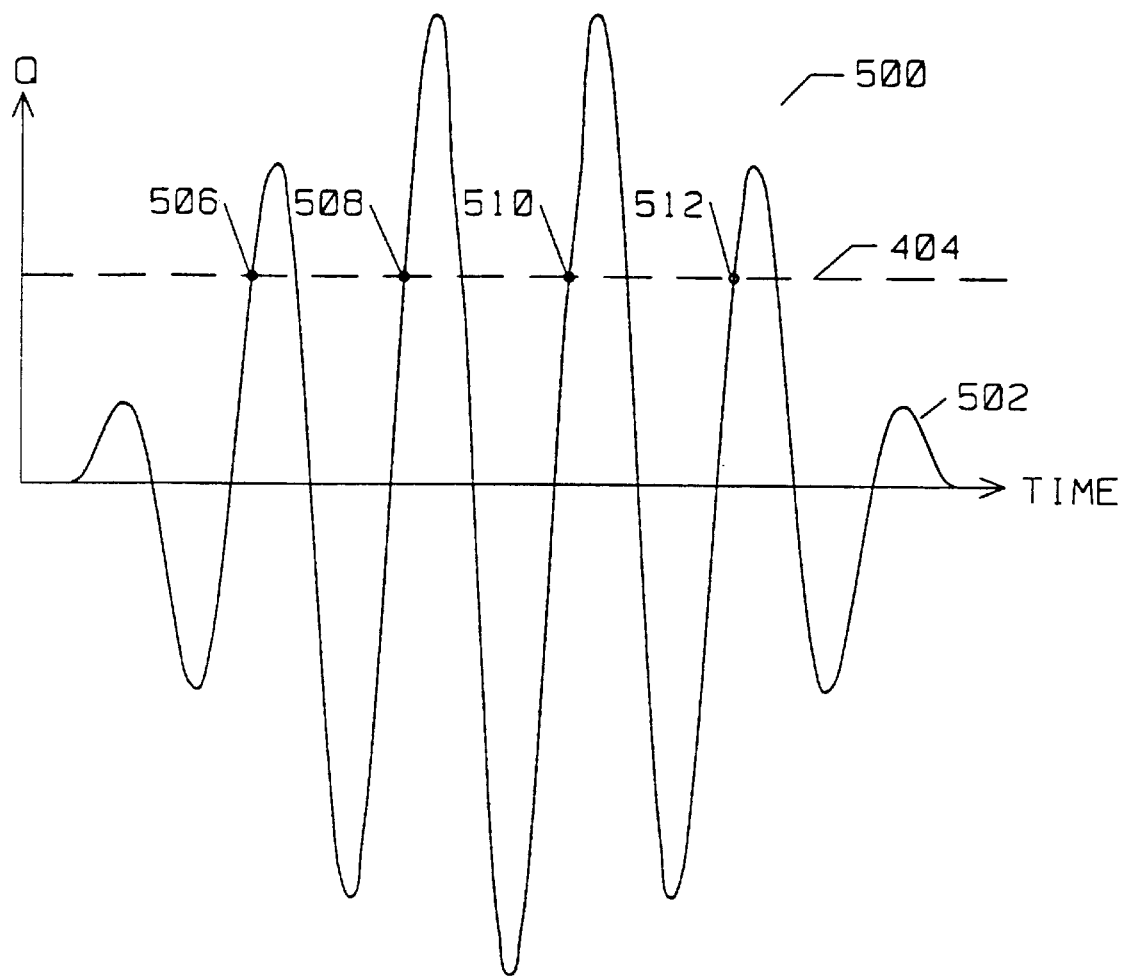
FIG. 5 is a plot of the quadrature voltage versus time for the burst impairment of FIG. 4.

FIG. 5 is a plot of the Q axis data versus time 500 derived from the IF vector diagram 400 of FIG. 4. The four crossing points 406, 408, 410, and 412 can be observed when a trace Q component 502 of IF trajectory 432 crosses the positive Q threshold voltage level 404 at a crossing point 506, a crossing point 508, a crossing point 510, and a crossing point 512. This Q component trace 502 could be observed on an oscilloscope connected directly to an IF or RF channel.

In hardware, a trigger circuit operating on a single channel can detect a voltage crossing at a preset voltage threshold. These trigger circuits are found in both totaling counters and oscilloscopes. They can also be assembled from circuits using fast comparator integrated circuits (ICs). Thus it is possible to estimate the amount of time the baseband noise trajectory 312 spends outside of the threshold region 332 by allowing it to spin, and detecting the threshold crossing points, 406, 408, 410 and 412 with a trigger circuit that inputs to a totaling counter. The total count of the totaling counter is divided by the spin rate. Allowing the noise trajectory 312 to spin is functionally equivalent to not demodulating the signal to baseband. That is, the trigger circuit is applied to an IF or RF signal. Because of the spinning action, the square threshold region 332 has been effectively replaced by a circular one with a radius of magnitude R. If the spinning rate is faster, the estimate of the amount of time outside the threshold will be more accurate. The spin rate, which is the reciprocal of the IF frequency, should be several times faster than the reciprocal of the bandwidth of the IF filter. Likewise, it is also possible to estimate the ratio of the amount of time outside of the threshold region 332 to the total amount of testing time.

Figure 6:
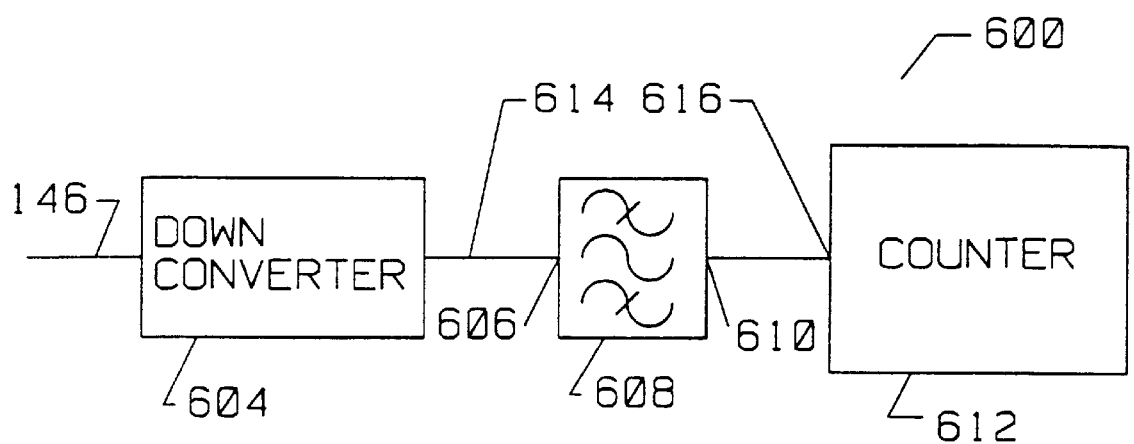
FIG. 6 is a block diagram of a test system utilizing a totaling counter

FIG. 6 is a block diagram of a downstream test system 600 that can be located at a remote point 152 and used to test a vacant downstream channel for the presence of impairments. The drop cable 146 is connected to a down converter 604 which converts one or more selected RF test channels to an IF frequency such as 44 MHz. Down converters are well known in the art and may be assembled from the modules in a Scientific Atlanta 6250 demodulator or by using the tuner out of a set top box. The down converter could optionally be a block converter for down converting a frequency band with several channels. The output of the down converter may be considered to be a downstream signal path output 614. A filter input 606 to a filter 608 connects to the down converter 604. The filter 608, which may be an intermediate frequency (IF) surface acoustic wave (SAW) filter, attenuates out of band energy, such as adjacent channels. The IF filter should have a bandwidth that is similar to the noise bandwidth of the signal for which the signal path is being tested. Thus, if the signal path was being characterized for a QPSK carrier with a bandwidth 2 MHz, the IF filter should also have a bandwidth of 2 MHz. A totaling counter input 616, on a totaling counter 612, is connected to a filter output 610. The totaling counter 612 may be a Hewlett Packard HP53131 as an example. The threshold trigger point for the totaling counter 612 is set at the voltage level 404 that would just cause the data being carried over the channel to have errors.

Setting this level can be done in a number of ways. First, the voltage level 404 can be mathematically computed. Second, the level can be determined experimentally by first applying a test data signal, then applying a sine wave interferer that causes the test carrier to start making errors. Next the test data signal is removed, and the error producing sine wave is used to set the trigger threshold level for the totaling counter. This method of triggering is outlined in a paper by the inventor titled "Proofing and Maintaining Upstream Cable Plant with Digital Signal Analysis Techniques" that was published in the 49$^{th}$ ARFTG Digest, page 7, Spring 1997 and is incorporated herein as a reference. A third way to set voltage level 404 is as a percentage of the levels of adjacent carriers in neighboring frequency bands. If the modulation type being tested for was high order QAM, such as 64 or 256 QAM, then the voltage level 404 will be set low. If the modulation is QPSK, the threshold level will be higher. Likewise, if the planned digital carrier will be carried on the channel at a lower level, such as 15 decibels (dB) below adjacent video carrier levels, then the voltage level 404 will be set lower. If the cable plant has excessive level drift with temperature, an AGC function, utilizing an adjacent channel with a carrier should be employed to maintain accurate results.

Thus, a noise impairment that may be random noise or CTB will be down converted by the down converter 604 and passed through the filter 608 to the totaling counter 612 where the count is increased according to the duration of the impairment. The fraction of the time that the impairment was above the threshold voltage level 404 can be computed by dividing the count total by the product of the IF center frequency times the number of seconds the test was run. For example, if the IF center frequency was 44 MHz, and the test lasted 10 seconds, and a total count of 100,000 was accumulated, the fraction of time outside of the threshold region can be computed as 2.27 E-4.

Figure 7:
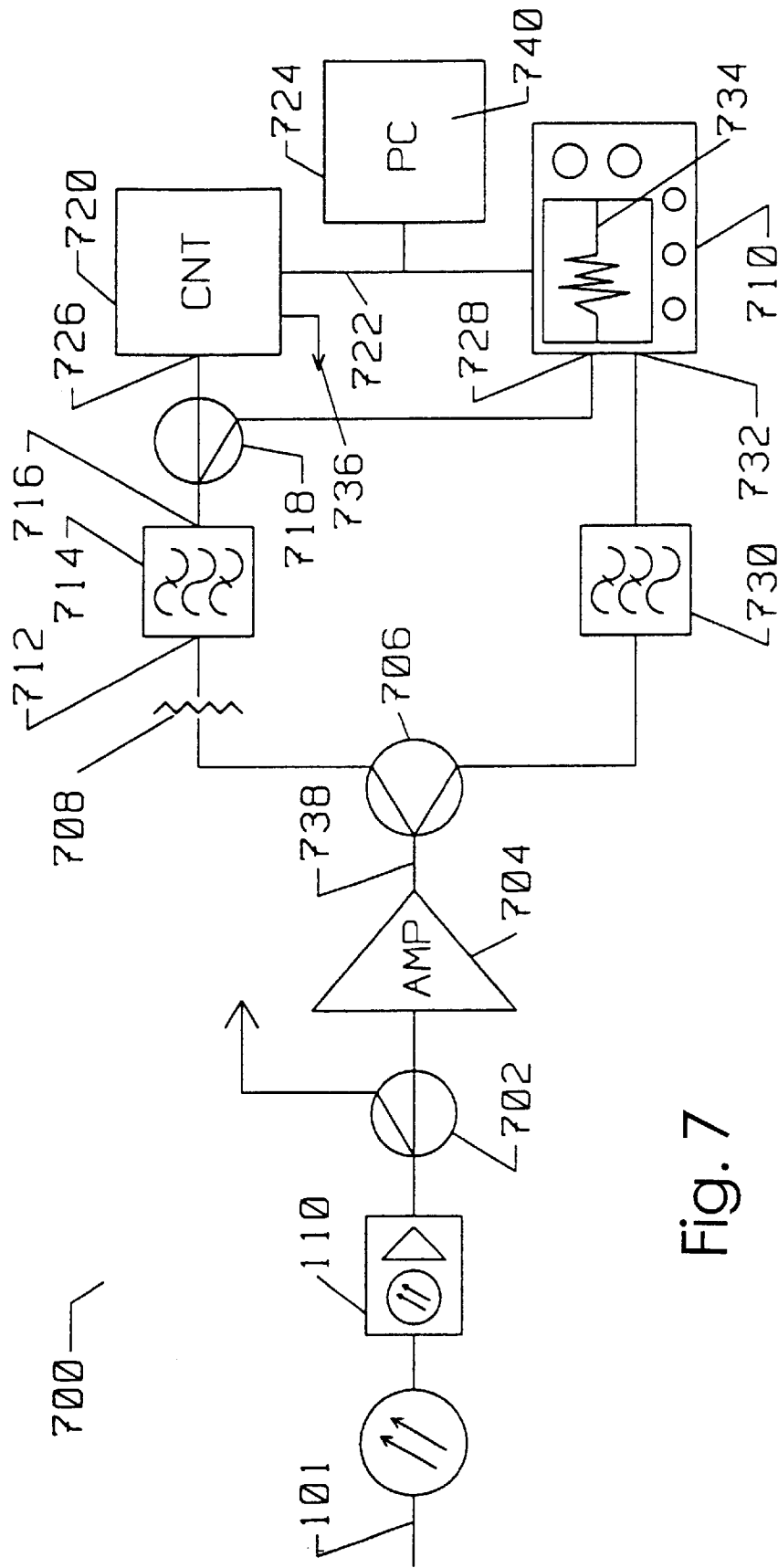
FIG. 7 is a block diagram of a test system utilizing a totaling counter and a digital time trace acquisition unit.

FIG. 7 is a block diagram of an upstream test system 700 that can be used to detect the presence of impairments in a channel that may be an upstream cable channel. In addition to counting threshold crossings, the system also records a time trace 734 of the impairments for characterization and later evaluation. The characterization may reveal, for example, if the interference was from radio signals or related to power line frequencies. It may also reveal if the burst noise was sufficiently powerful to distort active network elements. The system may be located in the headend 104 or a hub site. The upstream fiber optic cable 101 connects to the upstream laser receiver 110 which converts the light signal back into an electrical signal. A directional coupler 702 connects return signals to active reverse receivers which are not illustrated. The directional coupler 702 also provides reverse signals for an amplifier 704. The amplifier 704, which may be a Motorola CA2830 hybrid amplifier, boosts the reverse signal level in the 5–30 MHz band. The output of the amplifier may be considered to be an upstream signal path output 738. A splitter 706 splits the upstream signal path output for connection to an attenuator pad 708 and a digital time trace acquisition unit input 732 to a digital time trace acquisition unit 710 through a low pass filter 730. Herein after, the digital time trace acquisition unit 710 will be referred to as the acquisition unit 710, and the digital time trace acquisition unit input 732 will be referred to as the acquisition unit input 732. The acquisition unit input 732 is a channel for capturing time traces. The acquisition unit 710 may be the Tektronix TDS220 digital storage oscilloscope with a TDS2CM communication module. Alternatively, the acquisition unit 710 may be an oscilloscope card, such as a Gage CompuScope model 250, that plugs into a personal computer (PC). The attenuator pad 708 connects to a filter input 712 of a filter 714 that may be a bandpass filter. The filter 714 serves to block impairment energy and signals in frequency bands other than the test frequency band of interest, which may be 23–25 MHz as an example. A filter output 716 passes the filtered energy to the input of a filter splitter 718. The outputs of the filter splitter 718 connect to a totaling counter input 726 of a totaling counter 720 and to a digital time trace acquisition unit trigger input 728 of the acquisition unit 710. Herein after, the digital time trace acquisition unit trigger input 728 will be referred to as the acquisition unit trigger input 728. The acquisition unit trigger input 728 may be a channel capable of triggering the acquisition unit 710, or it may additionally be used as a second channel for capturing time traces. The totaling counter may be the Hewlett Packard model HP53131. Alternatively, the totaling counter 720 may be another model or a custom design that can provide a trigger output 736 that goes to a logic high state when the totaling counter 720 increases its count. The trigger circuit on the totaling counter 720 has a threshold set at the voltage level 404. The acquisition unit trigger input 728 also has its trigger voltage set at the voltage level 404. The totaling counter 720 and the acquisition unit 710 are connected via a general purpose instrumentation bus (GPIB) 722 to a PC 724. The acquisition unit 710 may be set to sample at a rate of 100 megasamples per second to capture 2500 voltage samples in 25 microseconds. This sampling rate means that aliasing will occur on signals with energy content over 50 MHz. If signals with energy content above 50 MHz will be sampled, the low pass filter 730 should be installed before the acquisition unit input 732 to attenuate energy at or above 50 MHz. The acquisition unit 710 may have a built-in low pass filter.

The upstream test system 700 functions as follows. When an impairment with sufficient energy to cause errors on a digital transmission is received by the system, the impairment is passed through the filter 714 to trigger both the totaling counter 720 and the acquisition unit 710. The acquisition unit 710 acquires the time trace 734 of the impairment and downloads the time trace over the GPIB 722 to the PC 724 where the time trace is stored on the hard drive. Unfortunately, at a sampling rate of 100 megasamples per second, if the impairment lasts longer than a few hundred microseconds, the memory of the acquisition unit 710 will be filled, depending on the memory depth. Even if the impairment continues on past the memory limit of the acquisition unit 710, the count associated with the impairment will be captured on the totaling counter 720. Thus the time trace can provide samples of the impairment, while the counter's value will provide a measure of the overall duration of the impairment. The counter is reset to zero periodically and the totaling count value is also stored in the PC 724 over the GPIB bus 722.

The stored data trace received on acquisition unit input 732 may be the complete return bandwidth, as illustrated. Alternately, it may be only the portion of the return band passed by the filter 714. If only the portion of the return band is of interest, the acquisition unit trigger input 728 may also be used as the signal input channel instead of the acquisition unit input 732.

Another way to trigger the acquisition unit 710 is to use a model of the totaling counter 720 that provides the trigger output 736. The acquisition unit trigger input 728 on the acquisition unit 710 is connected to the trigger output 736 on the totaling counter 720. This will eliminate the potential problem of mismatches in trigger levels.

Figure 8:
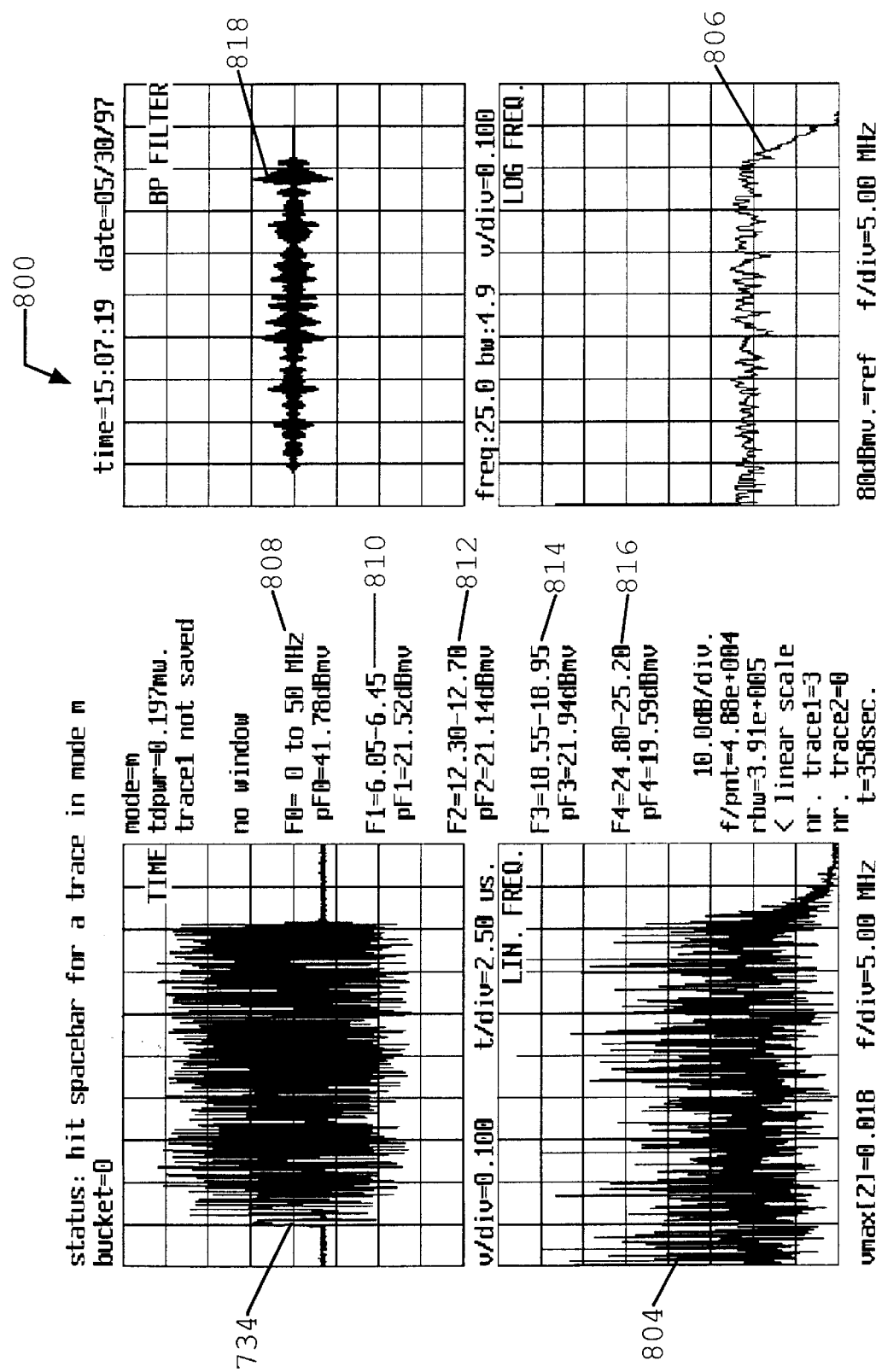
FIG. 8 is a group of plots produced from a time trace analysis by the test system.
Figure 9:
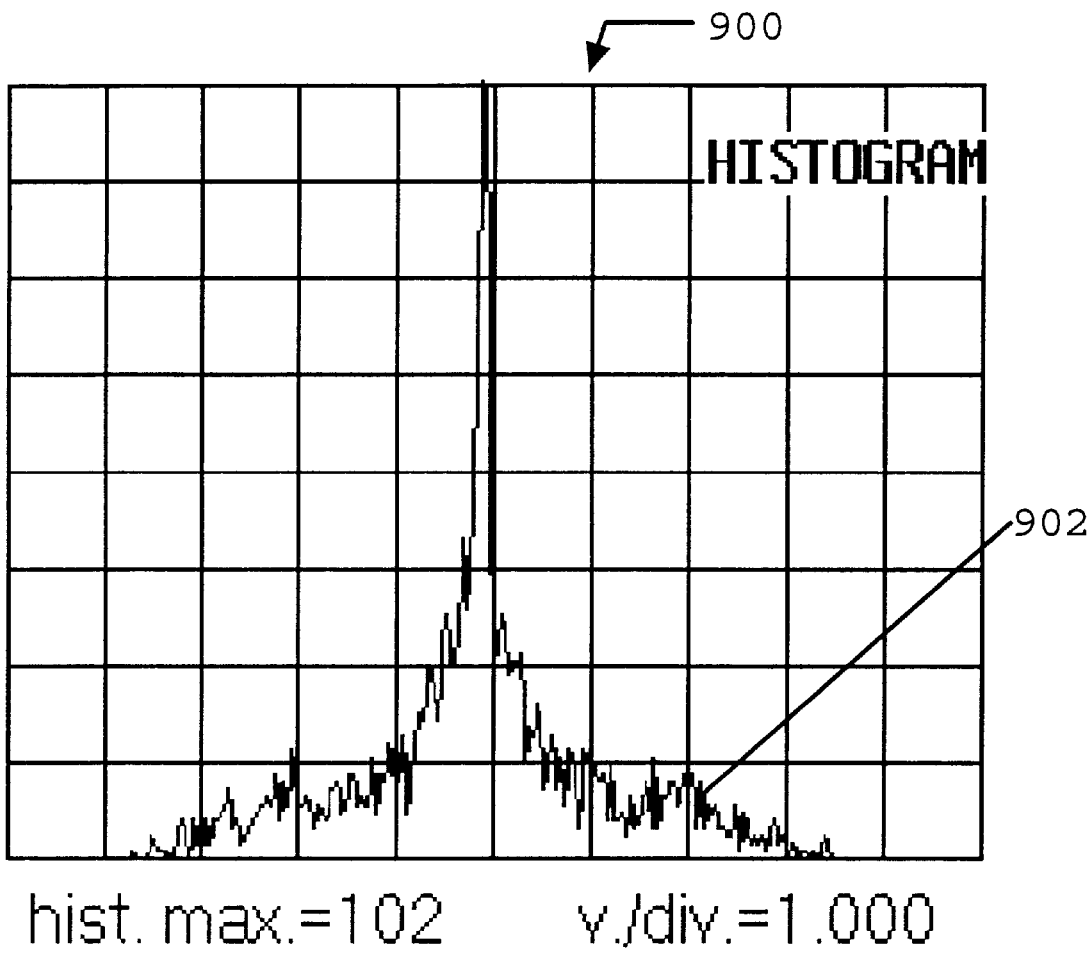
FIG. 9 is a histogram plot produced from time traces.
Figure 10:
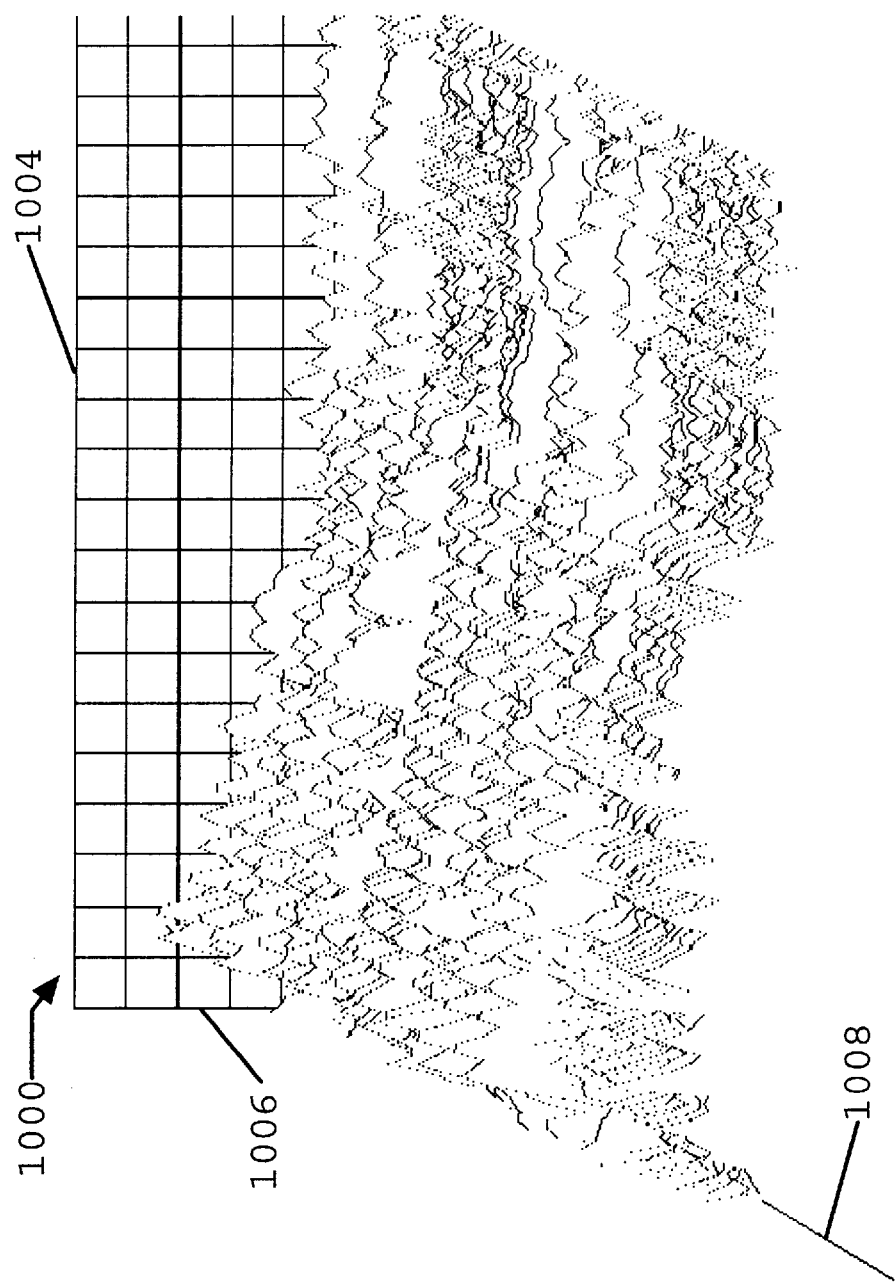
FIG. 10 is a waterfall plot produced from multiple spectral plots.

Description FIGS. 8–10

To characterize something is to describe the particular qualities, features, or traits of it. A signal path should be characterized in a manner that allows the system to be described in terms of how well it is doing, or is capable of doing, its essential task: transporting high speed digital signals reliably. It is also desirable to characterize the signal path in a way that allows problems to be identified, thereby improving technical operations by shortening repair times. Thus, how test data is analyzed and presented is important.

Some commercial BERT test equipment, such as the HP37701B, generate additional digital performance parameters based on bit error counts. These parameters are available seconds, unavailable seconds, errored seconds (ES), error free seconds (EFS), severely errored seconds (SES) and degraded minutes (DM). These performance parameters may be evaluated in accordance with CCITT G.821 (or other) recommended performance objectives. This test present system can generate the same data based on totaling counter counts.

Having captured a number of time traces that represent impairments, it is useful to match the time trace data with totaling count values. It is also useful to analyze the stored time trace data for what information they can reveal about signal path problems. Digital signal processing techniques are useful for this task.

FIG. 8 is a computer screen plot 800 of a software tool that can be used to help evaluate the nature of the impairment. The time domain data may be displayed as a time trace 734 of the impairment. 2500 eight bit voltage samples, each occupying one of 256 levels, make up the time trace 734. The time between samples is 10 nanoseconds, and a 25 microsecond trace is displayed. The time trace 734 can be used to inspect the peak to peak voltage of an impairment to check for clipping of active devices. The time trace 734 can also be used to check the duration of the impairment, provided the impairment's duration is shorter than the trace length. A linear spectral trace 804 is a plot of the frequency spectrum of the captured trace displayed as linear amplitude versus linear frequency. It is obtained by performing a fast Fourier transform (FFT) on 2048 of the 2500 samples contained in the time trace 734. The linear spectral trace 804 is made up of 2048 frequency samples and the frequency range is 0 to 50 MHz. The vertical scale is adjusted so that the strongest frequency term is set to the top line. If desired, the data can be windowed by one of a number of standard window functions prior to transformation to reduce leakage. The code to do the FFT and the windowing is available in the book "C Language Algorithms for Digital Signal Processing" by Embree and Kimble. In this example, the FFT provides a frequency domain sample every 48.8 kHz. A log spectral trace 806 is a logarithmic representation of the linear spectral trace 804. The log spectral trace 806 plots log amplitude versus linear frequency. The log spectral trace 806 provides an adjustable effective frequency resolution bandwidth. This is accomplished by summing together adjacent frequency samples. In this example, the number of summed frequency samples has been set at 8, yielding a resolution bandwidth of 391 kHz.

A set of frequency band power markers consisting of a frequency band marker 808, a marker 810, a marker 812, a marker 814, and a marker 816 are provided to measure the power in different user programmable frequency bands. Power may be measured in units of milliwatts, microwatts, dbm. (decibels above a milliwatt) and dBmv. (decibels above a millivolt).

Having captured a time domain trace of the entire return frequency band, it is useful to observe how much of the trace produced energy in the frequency band of interest. This information can be obtained with a software digital filter 740 in the PC 724 by either of two methods. The first method is to multiply the complex coefficients of the linear spectral trace 804 by a frequency domain filter function such as a raised cosine, and then performing an inverse FFT on the resultant data to obtain a filtered time domain trace 818. The second method is to perform a linear or a circular convolution of the time domain samples in time trace 734 with the impulse function of a bandpass filter. Both methods are known in the art. The filtered time domain trace 818 is the result of an inverse FFT. This filtered time domain trace 818 is similar to the trace Q component 502 in that it represents the output of a bandpass filter. The trace data displayed in the computer screen plot 800 was generated by a pseudo-noise test signal that can be used for channel linearity testing.

Another useful digital signal processing function is to perform a probability distribution plot, or a histogram plot 900 of the voltage samples of the time trace 734. This is illustrated in FIG. 9 as a histogram curve 902. This plot is created by grouping sample points with the same voltage value into common bins, and plotting how many samples are in each bin. With 8 bits of data per point, 256 bins are used. The histogram curve 902 is useful to observe abnormal channel loading or evidence of laser clipping. Normal channel loading should have the appearance of a bell-shaped histogram curve. The vertical scale is adjusted to place the bin with the most samples at the top of the histogram curve 902. Optionally, the histogram may accumulate voltage samples over many time traces.

A software package with these digital signal processing and plotting functions was first offered for sale and demonstrated at the 1997 SCTE Emerging Technologies conference in June of 1997 in Orlando Fla. by the inventor. The software is called "Burst Viewer" and the sales brochure is incorporated herein as a reference.

In addition to capturing impairments, the upstream system 700 can be used to capture and store data traffic or test signals for additional analysis. The samples can also be captured at random times for later review, or manually captured by an operator.

The log spectral traces 806 may be grouped together and viewed as a waterfall display. FIG. 10 is a waterfall plot 1000 of impulsive noise from a return cable system in Nebraska. A horizontal axis 1004 is frequency, a vertical axis 1006 is log amplitude, and a diagonal time axis 1008 goes down and to the left. The filter 714 was a bandpass filter that had a bandwidth of 2 MHz and a center frequency of 25 MHz. Note that if the traces are captured when impulse noise triggers the oscilloscope, the time axis 1008 will be non-linear. If the traces are captured at uniform time intervals, the time axis 1008 will be linear.

An other useful tool for the characterization of a signal path is a plot of totaling counter values versus time. This plot is not illustrated. This plot could display, for example, 1 minute totaling counter values on a vertical axis, and 24 hours of time on a horizontal axis. This plot would quickly allow the start and stop times of high impairment time periods to be discovered.

Figure 11:
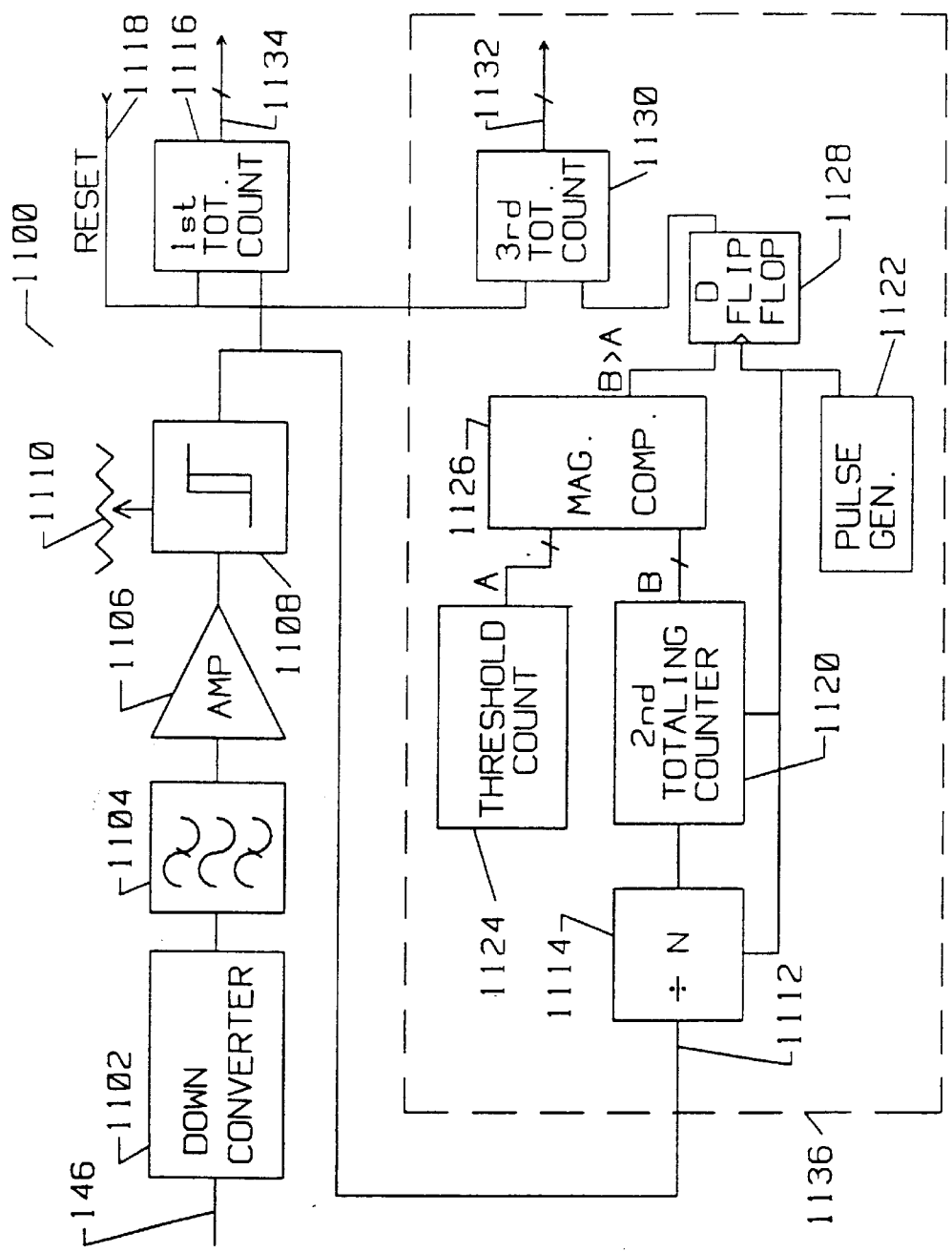
FIG. 11 is a block diagram of a test system that determines if an error would occur in a transmission using forward error correction.

Description FIG. 11

Many of the digital modulation systems being used for both forward and reverse signal paths have the feature of forward error correction (FEC). FEC provides the capability of correcting errored symbols, provided the number of symbols in error in a block is not too large. One of the forward error correcting codes being used is the Reed-Solomon code. Thus, an isolated symbol error would not be of great interest, since it would be corrected. However, it would be desirable to count the number of blocks with more errors than the FEC code could correct. The test system can be improved by adding a circuit to detect block errors 1136 to estimate the number of errors in a time interval.

FIG. 11 is a test system 1100 to detect a total number of threshold crossings as well as a number of block errors. The portion of the system that detects the total number of threshold crossings is similar to the test system 600 or the test system 700. The circuit to detect block errors 1136 has been added to the system that detects the total number of threshold crossings. The drop cable 146 connects the system to the tap 140. A down converter 1102 mixes the signal to an IF bandwidth, such as 44 MHz. A filter 1104 filters the down converted signal, and an amplifier 1106 boosts the signal level. A trigger circuit 1108 provides a rising voltage on a trigger circuit output 1112 when the input IF signal exceeds the voltage level 404. The trigger circuit output 1112 can be used as a trigger output 736. A potentiometer 1110 provides an adjustable reference trigger voltage for the trigger circuit 1108. Trigger circuits are commonly designed with some voltage level hysteresis signal to prevent oscillation and excess counts from noise. The output of the trigger circuit 1108 is applied to a first totaling counter 1116, which is periodically reset by a reset line 1118. This first totaling counter 1116 counts all threshold crossings. A divide by N circuit 1114 is optional and may reduce the cost of the digital circuitry. The use of the divide by N circuit 1114 is advisable if a high IF frequency is chosen. A second totaling counter 1120 also counts all threshold crossings, divided by N, but it is periodically reset to zero by a pulse generator 1122. The pulse generator 1122 generates pulses with a period of approximately the same duration as the length of a data packet, or a Reed Solomon block. A threshold count circuit 1124 provides a threshold count value which is proportional to the number of errored symbols that would be correctable by a forward error correction circuit. The correct threshold count value will be influenced by the value of N in the divide by N circuit, as well as the error correcting power of the FEC code. The threshold count circuit 1124 may incorporate thumb wheel switches, or dual in-line package (DIP) switches. Assuming N is one, if the number of threshold crossings that occurs between pulses from the pulse generator 1122 is greater than the threshold count value, a high level will appear at the output of a magnitude comparator 1126. A high level on the input to a "D" flip flop 1128 causes the "D" flip flop to set its output to a logic "1" when the output from the pulse generator 1122 goes high. When the output from the pulse generator 1122 goes high, it resets the second totaling counter 1120 and the divide by N circuit 1114, to zero. A "1" on the output of the "D" flip flop 1128 means the level of impairment is sufficiently severe that a packet, if there was a packet being transported over the signal path, would not be correctable. Uncorrectable packets are counted by a third totaling counter 1130. The number of uncorrectable packets is available on a bad packet count output 1132. The total number of errors is available on a total error output 1134. After the count values are read, they may be reset by the reset line 1118.

The logic family to build the block diagram may be high speed CMOS. The 74HC161 IC counter may be used to construct the first totaling counter 1116, the second totaling counter 1120, the third totaling counter 1130, and the divide by N circuit 1114. Cascaded sections of the 74HC85 IC may be used to build the magnitude comparator 1126. The "D" flip flop 1128 may be the 74HC74 IC. The pulse generator 1122 may use the 555 timer IC. The trigger circuit 1108 may use a high speed comparator integrated circuit (IC) such as the Precision Monolithics CMP-08 which has an emitter coupled logic (ECL) output. The ECL logic output must be converted to high speed CMOS levels. It is desirable to make the circuit as low in cost as many will be used in a headend with many upstream laser receivers, such as the laser receiver 110. Likewise, it may be advantageous to place the count total outputs from multiple test systems 1100 on a parallel bus structure. This is done for ease of access by a headend monitoring device that may be a PC.

The embodiment of FIG. 11 can be modified for additional counting circuits having different threshold counts and/or additional pulse generators having different periods. This modification would allow experimentation to see if different FEC codes would prove beneficial.

Summary Ramifications and Scope

Although specific embodiments are disclosed for example herein, it is expected that persons skilled in the art can and will design alternative test systems that are within the scope of the following claims either literally or under the Doctrine of Equivalents. In particular, the following enhancements and modifications are anticipated:

1. An alarm may be sounded by the test system if the number of impairments is excessive.
2. Multiple test systems with different threshold settings may be simultaneously operated from the same input wire and the same filter. This test system would show the improvement in data integrity that could be observed if data carriers were operated at a higher power level.
3. Multiple test systems with similar threshold settings may be simultaneously operated from the same input wire but with different filters. This test system would show which frequency bands are less impaired.
4. The test system could be used in a frequency band with active data carriers or test signals if the counter was disabled or reset while active carriers or test signals were transmitting.
5. The filter could have any frequency response. The filter could be a band pass filter, a band stop filter, or a wire with a flat frequency response. If a wire replaced the filter, the system feeding the test system would determine the frequency response. A band stop filter could be used to prevent data traffic from increasing the counter's value.
6. This test system could be used in conjunction with a bridger switching system or with switchable taps to automatically locate bad portions of networks.
7. The test system could be used with any type of RF channel besides cable channels. For example, terrestrial broadcast channels or microwave channels could be tested.

8. The system of FIG. 6 can be improved by making the down converter 604 frequency agile. With an agile down converter, other vacant channels can also be tested. The agile down converter can be used to measure signal strength on occupied channels. This can be done by tuning to the occupied channel and adjusting the totaling counter's threshold upward or downward to determine the peak signal level. The peak signal level will be the point at which the totaling counter stops counting. The measure of adjacent carriers can be used to set voltage level 404. This is one method to compensate for temperature drifts in the received signal level.
9. A negative Q threshold level trigger circuit could be used in addition to the positive Q voltage level 404 trigger circuit, at the expense of additional hardware. Additionally, positive I and negative I thresholds could be employed. If a negative Q threshold were used, the totaling counter's value would be halved.
10. The test system of the present invention can be incorporated as a part of a status monitoring system with filters and totaling counters located in status monitoring modules placed inside 2-way amplifier housings or in housings at fiber nodes. Alternatively, the filters and totaling counters may be incorporated inside analog or digital set top boxes or cable modems to perform monitoring of downstream plant on a vacant channel while the set top box or cable modem is not being used by a subscriber.

Description of Item Numbers
100 bi-directional cable system
101 single mode upstream fiber optic cable
102 single mode downstream fiber optic cable
104 headend
106 fiber node
108 downstream laser transmitter
110 upstream laser receiver
112 downstream laser receiver
114 upstream laser transmitter
116 diplex filter
118 hard line coaxial cable
120–122 splitter/combiner
124–134 2-way amplifier
136 diplexer high pass section
138 diplexer low pass section
140 tap
142 coaxial cable plant
144 house
146 drop cable
148 upstream signal path
150 downstream signal path
152 remote point

200 I-Q plot of a demodulated baseband QPSK signal
202 I threshold line
204 Q threshold line
206–212 points
214 positive I limit
216 negative I limit
218 positive Q limit
220 negative Q limit
222 noise vector
224 signal trajectory

300 I-Q plot of a demodulated baseband burst impairment
301 single point
302 origin
304 positive I limit
306 negative I limit
308 negative Q limit
310 positive Q limit
312 baseband noise trajectory
314–330 uniform baseband time samples
332 threshold region
334 vector

400 I-Q plot of the un-demodulated burst impairment at an IF frequency
402 origin
404 voltage level
406–412 a set of crossing points
414–430 IF impulse time samples
432 IF trajectory

500 plot of Q axis data vs. time
502 trace Q component
506–512 crossing points

600 downstream test system
604 down converter
606 filter input
608 filter
610 filter output
612 totaling counter
614 signal path output
616 totaling counter input

700 upstream test system
702 directional coupler
704 amplifier
706 splitter
708 attenuator pad
710 digital time trace acquisition unit
712 filter input
714 filter
716 filter output
718 filter splitter
720 totaling counter
722 GPIB
724 PC
726 totaling counter input
728 digital time trace acquisition unit trigger input
730 low pass filter
732 digital time trace acquisition unit input
734 time trace
736 trigger output
738 upstream signal path output
740 software digital filter

800 computer screen plot
804 linear spectral trace
806 log spectral trace
808–816 frequency band markers
818 filtered time domain trace
900 histogram plot
902 histogram curve

1000 waterfall plot
1004 horizontal axis—frequency
1006 vertical axis—log amplitude
1008 diagonal axis—time

1100 test system to detect block errors
1102 down converter
1104 filter
1106 amplifier 1108 trigger circuit
1110 potentiometer
1112 trigger circuit output
1114 divide by N circuit
1116 1st totaling counter
1118 reset line
1120 second totaling counter
1122 pulse generator
1124 threshold count circuit
1126 magnitude comparator
1128 D flip flop
1130 third totaling counter
1132 bad packet count output
1134 total error output
1136 a circuit to detect block errors.

What I claim is:

1. A test system for characterizing an impairment affecting a signal path comprising:
   a signal path output with a vacant frequency band;
   a filter passing said vacant frequency band;
   a filter input;
   a filter output;
   a digital time trace acquisition unit;
   a digital time trace acquisition unit input;
   a digital time trace acquisition unit trigger input;
   a time trace, said filter input connected to the signal path output, said filter output connected to the digital time trace acquisition unit trigger input and said signal path output connected to said digital time trace acquisition unit input, and
   wherein impairments from the signal path pass through the filter and trigger said digital time trace acquisition unit and said digital time trace acquisition unit acquires said time trace of said impairments upon triggering.

2. A test system for characterizing an impairment affecting a signal path claim, as per claim 1, further comprising a histogram plot whereby the time trace is processed into the histogram plot.

3. A test system for characterizing an impairment affecting a signal path claim, as per claim 1, further comprising:
   a filtered time domain trace;
   a software digital filter, and
   whereby the time trace is processed with the software digital filter for display as the filtered time domain trace.

4. A test system for characterizing an impairment affecting a signal path claim, as per claim 1, further comprising:
   a waterfall plot, and
   whereby multiple time traces are processed with a fast Fourier transform for display as the waterfall plot.

5. A test system for characterizing an impairment affecting a signal path, as per claim 1, further comprising:
   a spectral plot obtained by processing the time trace.

6. A test system for characterizing impairments affecting a signal path with a vacant frequency band comprising:
   a filter connected to said signal path and passing said vacant frequency band;
   a totaling counter connected to the output of said filter, said totaling counter having a threshold value, and
   wherein signal path impairments having a value in excess of said threshold value increment said totaling counter.

7. A test system for characterizing impairments affecting a signal path, as per claim 6, further comprising:
   a circuit to detect block errors, and
   wherein an impairment that would cause a block of data to be corrupted is counted and an impairment that would not corrupt the block of data is not counted.

8. A test system for characterizing impairments affecting a signal path, as per claim 6, further comprising:
   a digital time trace acquisition unit;
   a digital time trace acquisition unit trigger input;
   a digital time trace acquisition unit input;
   a time trace;
   said signal path output is connected to the digital time trace acquisition unit input and said filter output is connected to said digital time trace acquisition unit trigger input, and
   said trigger input is set such that impairments of sufficient amplitude to increment said totaling counter trigger said digital time trace acquisition unit and said digital time trace acquisition unit acquires said time trace of said impairments upon triggering.

9. A test system for characterizing impairments affecting a signal path, as per claim 6, further comprising:
   a digital time trace acquisition unit;
   a digital time trace acquisition unit trigger input;
   a digital time trace acquisition unit input;
   a time trace;
   a trigger output associated with said totaling counter;
   said signal path output is connected to the digital time trace acquisition unit input and said trigger output is connected to said digital time trace acquisition unit trigger input, and
   wherein incrementing said totaling counter causes said trigger output to trigger said digital time trace acquisition unit and said digital time trace unit acquires said time trace of said impairments upon triggering.

10. A test system for characterizing impairments affecting a signal path, as per claim 6, further comprising:
    a plurality of bandpass filters connected to a plurality of totaling counters whereby the severity of impairments can be counted in multiple frequency bands.

11. A test system for characterizing impairments affecting a signal path, as per claim 6, further comprising:
    said filter with a bandwidth matching a data carrier and said threshold value of said totaling counter set to a level that would cause a data carrier to make an error, and
    whereby the error rate said impairment could cause in a data carrier can be determined.

12. A test system for characterizing impairments affecting a signal path, as per claim 11, further comprising the steps of:
    dividing a count value accumulated on the counter by the product of the filter's center frequency and the duration of the test, and
    whereby the fraction of the test time that the signal path was impaired can be determined.

13. A test system for characterizing impairments affecting a signal path, as per claim 6, wherein said signal path is one of either an upstream or downstream path of a CATV distribution system, rf, wireless or microwave distribution system.

14. A test system for characterizing impairments affecting a signal path, as per claim 6 further comprising:
    a plurality of totaling counters with multiple threshold levels connected to the filter output whereby the severity of impairments can be counted for multiple threshold levels.

15. A test system for characterizing impairments affecting a signal path, as per claim 6 further comprising an adjustable threshold value wherein multiple count values may be obtained at multiple threshold levels.

16. A test system for characterizing impairments affecting a signal path, as per claim 6, further comprising a down converter connected between said signal path and said filter.

17. A test system for characterizing impairments affecting a signal path, as per claim 6 further comprising:
an agile downconverter connected between the signal path and the filter wherein a test channel is selected by tuning the agile downconverter.

18. A test system for characterizing impairments affecting a signal path, as per claim 17 wherein said threshold value is adjusted to determine a peak signal level.

19. A system for characterizing impairments affecting a signal path comprising:
a filter connected to said signal path via a frequency converter providing a frequency converted and filtered output of said impairments;
a totaling counter which maintains a count value representative of the number of times said filtered output traverses a predetermined threshold value during a test duration time, and
wherein said count value characterizes said impairment.

20. A system for characterizing impairments affecting a signal path, as per claim 19, wherein said threshold value is chosen such that a filtered output amplitude which traverses said threshold value is sufficient to cause a data error in a signal.

21. A system for characterizing impairments affecting a signal path, as per claim 19, wherein said threshold value is adjustable.

22. A test system for characterizing impairments affecting a signal path, as per claim 19, wherein said signal path is one of either an upstream or downstream path of a CATV distribution system, rf, wireless or microwave distribution system.

23. A system for characterizing impairments affecting a signal path, as per claim 19, wherein at least one of said impairments, a peak signal level of a signal passing through said filter, data traffic, or test signals passing through said filter are determined.

24. A system for characterizing impairments affecting a signal path, as per claim 19, further comprising:
a digital time trace acquisition unit and associated trigger input and signal input;
wherein said signal input is connected to said signal path and said trigger input is connected to said filtered output, and
impairments of sufficient amplitude to cause said count value of said totaling counter to change trigger said digital time trace acquisition unit causing digital time trace acquisition unit to record a time trace of said impairments.

25. A system for characterizing impairments affecting a signal path, as per claim 24, further comprising:
a microprocessor based device connected to the outputs of said counter and digital time trace acquisition unit, and
wherein said microprocessor device stores and performs processing operations on said count value or said time trace.

26. A system for characterizing impairments affecting a signal path, as per claim 19, further comprising:
a digital time trace acquisition unit and associated trigger input and signal input;
a trigger output associated with said counting means, said signal input operatively connected to said signal path and said trigger input connected to said trigger output;
impairments of sufficient amplitude to cause said count value of said totaling counter to change cause said trigger output to trigger said digital time trace acquisition unit and digital time trace unit acquires said time trace of said impairments upon triggering.

27. A system for characterizing impairments affecting a signal path, as per claim 19, further comprising a block error detector connected to said filtered output, and
wherein block error detector means maintains a count value representative of the number of data blocks which would have uncorrectable errors.

28. A system for characterizing impairments affecting a signal path, as per claim 19, further comprising a plurality of bandpass filters connected to a plurality of totaling counters whereby the severity of impairments can be counted in multiple frequency bands.

29. A system for characterizing impairments affecting a signal path, as per claim 19, further comprising the steps of:
dividing a count value accumulated on the counter by the product of the filter's center frequency and the duration of the test, and
whereby the fraction of the test time that the signal path was impaired can be determined.

30. A test system for characterizing undesirable energy of a signal path within a selected frequency band comprising:
a signal path comprising a plurality of data channels and at least one test channel wherein said test channel is in said frequency band;
a filter for selecting said test channel from the plurality of said data channels;
a counter responsive to the test channel signal amplitude which maintains a count of the number of times said test channel amplitude traverses a threshold value, and
wherein said test channel signal consists substantially of said undesirable energy and said threshold value is the value at which said undesirable energy could cause a data error in a signal.

31. A method for characterizing undesirable energy of a signal path within a frequency band comprising:
determining a threshold value at which said undesirable energy could cause a data error;
selecting a test channel within said frequency band wherein said test channel consists primarily of said undesirable energy, and
maintaining a count of the number of times said undesirable energy traverses said threshold value during a test duration.

* * * * *